United States Patent [19]

Katariya et al.

[11] Patent Number: 5,569,019
[45] Date of Patent: Oct. 29, 1996

[54] TEAR-AWAY COMPOSITE FAN STATOR VANE

[75] Inventors: Devinder N. Katariya, Chandler; Ronald J. Rich, Phoenix; Steven C. Stenard, Scottsdale; Bruce D. Wilson, Gilbert, all of Ariz.

[73] Assignee: AlliedSignal Inc., Morris Township, N.J.

[21] Appl. No.: 576,023

[22] Filed: Dec. 21, 1995

Related U.S. Application Data

[63] Continuation-in-part of Ser. No. 173,318, Dec. 22, 1993, Pat. No. 5,494,404.

[51] Int. Cl.$^6$ .................................................. F04D 29/44
[52] U.S. Cl. .................................................. 415/200
[58] Field of Search ........................ 415/200; 416/229 R, 416/229 A, 230

[56] References Cited

U.S. PATENT DOCUMENTS

| | | | |
|---|---|---|---|
| 4,786,347 | 11/1988 | Angus | 416/230 |
| 5,145,319 | 9/1992 | Glowacki | 416/230 |
| 5,380,152 | 1/1995 | Sikorski et al. | 415/200 |
| 5,458,465 | 10/1995 | von Wieser et al. | 416/230 |

*Primary Examiner*—John T. Kwon
*Attorney, Agent, or Firm*—James W. McFarland

[57] ABSTRACT

A unitary composite stator vane for a gas turbine engine comprising an aerodynamically configured airfoil section, a foot extending substantially perpendicularly from one end of the airfoil section, and a smoothly contoured transition section interconnecting the airfoil section with the foot. The stator vane is comprised of a composite material including a plurality of compression molded, heat cured plies. The plies include a plurality of centrally located internal plies of reinforcement material of continuous yarns of para-aramid fibers. On each side of the internal plies are plies of resin impregnated graphite fiber material. The graphite fibers are protected by an external steel wire mesh ply covering the leading edges of the vanes. Substantially all of the internal para-aramid reinforcement fibers are discontinuous proximate the transition section between the airfoil section and foot.

11 Claims, 3 Drawing Sheets

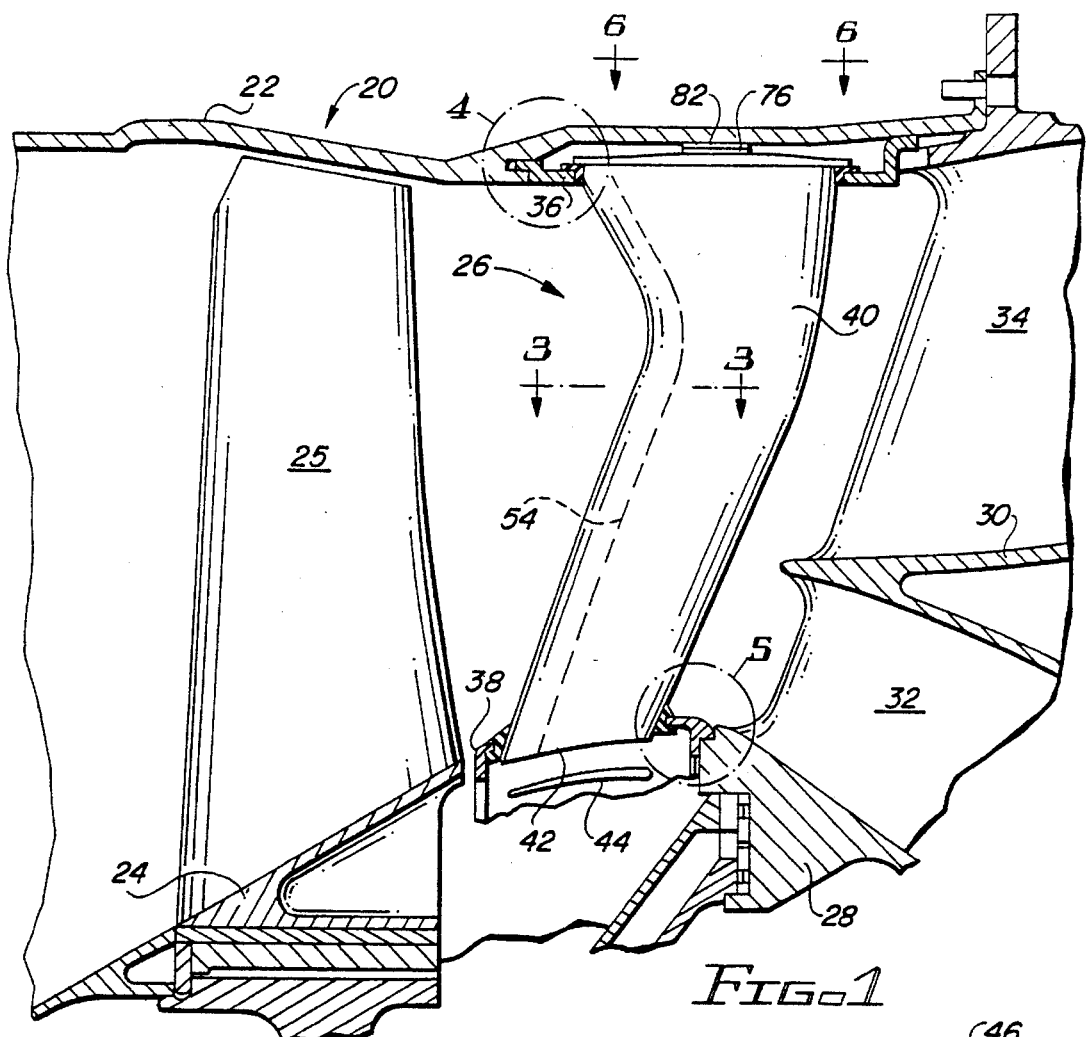
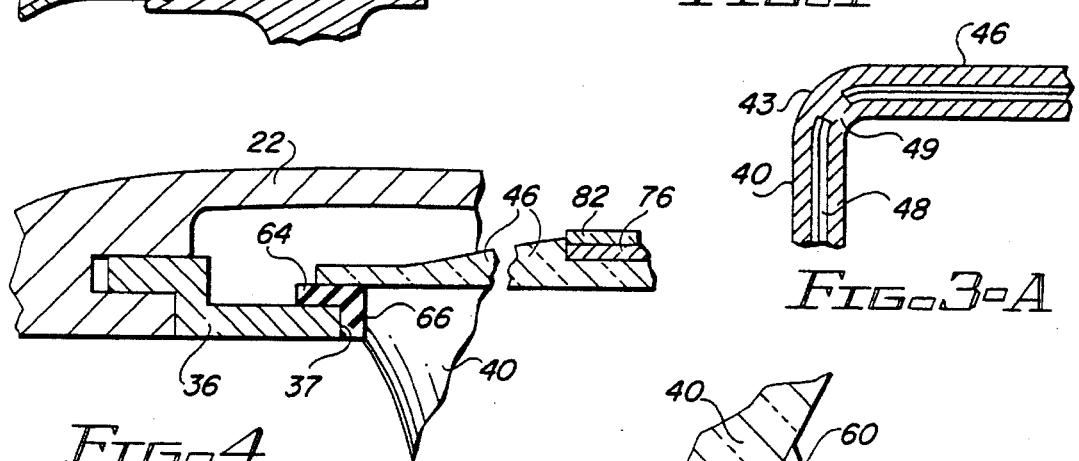
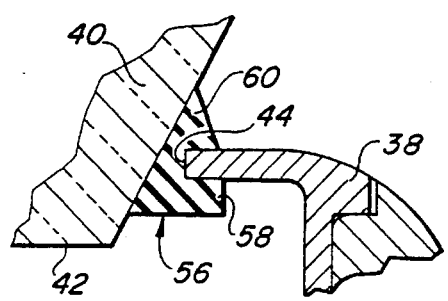

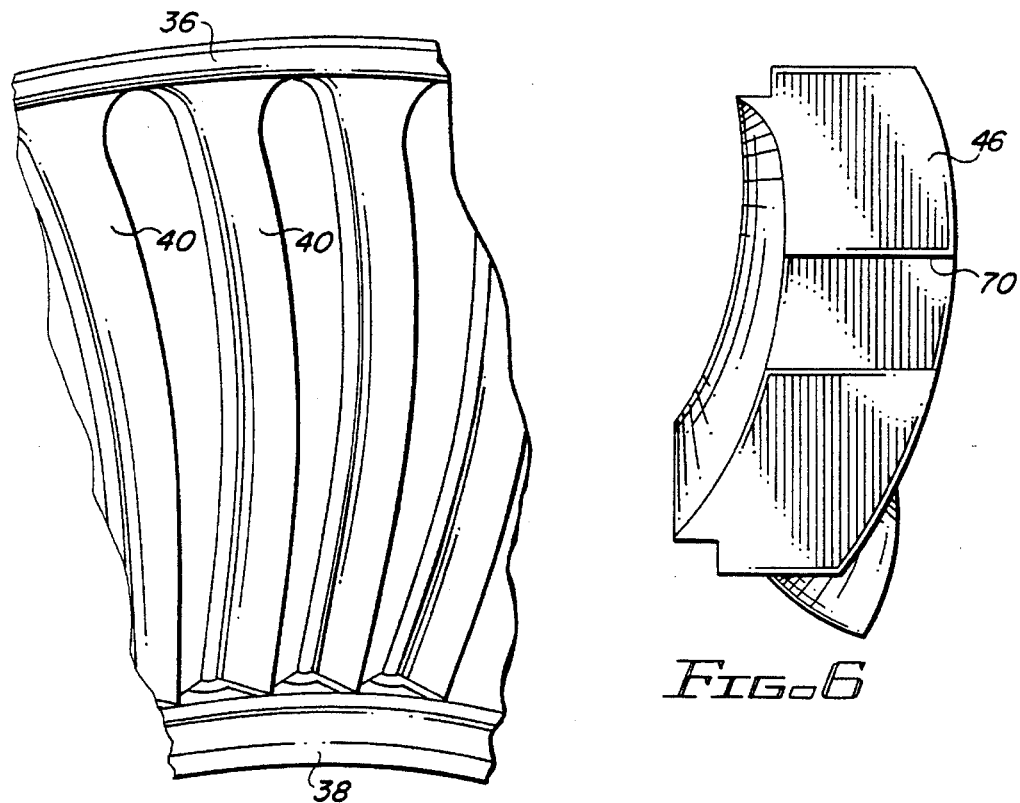
FIG. 11
FIG. 6
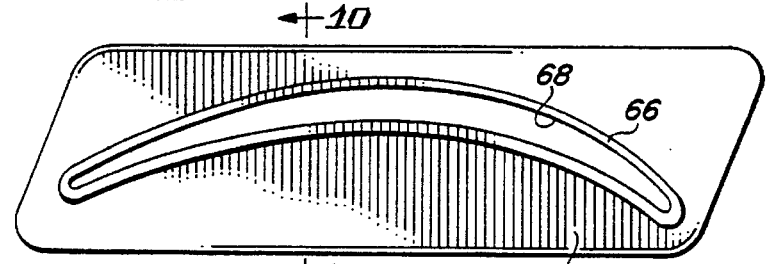
FIG. 9
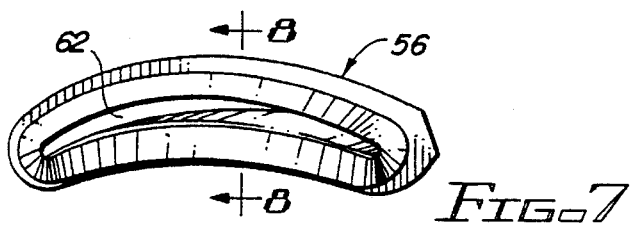
FIG. 7
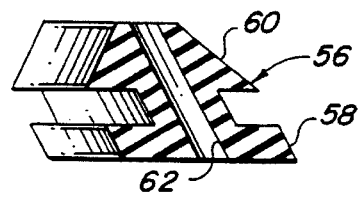
FIG. 8
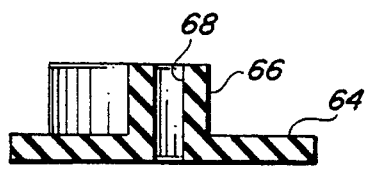
FIG. 10 ns is a continuation-in-part of U.S. Patent application
Ser. No. 08/173,318, filed Dec. 22, 1993, U.S. Pat. No.
5,494,404, entitled "Insertable Stator Vane Assembly", having common assignee herewith.

TECHNICAL FIELD

This invention relates to gas turbine engines, and relates more particularly to a stator vane apparatus for use in such a gas turbine engine.

BACKGROUND OF THE INVENTION

Turbofan gas turbine engines include a forwardly located, high speed rotary fan which receives, compresses, and discharges the primary air flow of the gas turbine engine to produce power, either in the form of thrust for an aircraft or to produce rotary mechanical power. Disposed immediately downstream of the fan is a fan stator assembly comprising a plurality of stator vanes spanning the duct carrying the compressed air flow from the fan. The stator vanes operate to redirect the direction and amount of swirl imparted to the compressed air such that it is in proper swirl orientation for the next stage of engine operation and/or to straighten bypass airflow. Normally the following stage is the first stage of a high pressure compressor. It is important that the mass of such a stator vane assembly be minimized to minimize overall weight of the engine, yet be tolerant of foreign object damage which may occur when foreign objects are carried through the fan in the inlet air flow.

Typically, the complexity of such a fan stator assembly requires very lengthy assembly time due to the number of components. For example, sixty to eighty stator vanes are not uncommon for such a fan stator assembly. Complexity and the length of time for assembly directly contributes to the overall cost of the engine. Repair and overhaul of typical stator assemblies cannot be accomplished except at the site of original manufacture.

SUMMARY OF THE INVENTION

It is an important object of the present invention to provide an improved stator vane assembly structure, which dramatically reduces overall assembly time by utilizing stator vanes that are readily insertable radially through the outer shroud and into the inner hub.

Another important object of the present invention is to provide an improved stator vane assembly of the type described which, by virtue of its assembly techniques, does not rigidly intersecure the inner radial tip end of the stator vanes to the hub, to provide a controlled, predictable vane failure in the event of foreign object damage to prevent further damage to the engine and to allow continued operation thereof.

Another important object of the present invention is to provide an improved stator vane assembly of the type referred to wherein the stator vane is of a light weight, composite, nonmetallic material resistant to erosion, and subject to a controlled, predictable failure in the event of foreign object damage.

These and other objects and advantages of the present invention are specifically set forth in, or will become apparent from the following detailed description of a preferred embodiment of the invention, when read in conjunction with the accompanying drawings.

BRIEF DESCRIPTION OF THE DRAWINGS

FIG. 1 is a partial side elevational, cross sectional view of a portion of a gas turbine engine incorporating the present invention;

FIG. 3A is a partial elevational cross sectional view of the transition section of a stator vane as viewed along lines 3A—3A of FIG. 2;

FIG. 4 is an enlarged partial elevational cross sectional view of the area denoted by lines 4—4 of FIG. 1;

FIG. 5 is a view similar to FIG. 4 but showing the area denoted by lines 5—5 of FIG. 1;

FIG. 6 is a top plan view of the foot portion of a stator vane as viewed along lines 6—6 of FIG. 1;

FIG. 7 is a top plan view of the hub grommet;

FIG. 8 is an elevational cross sectional view taken along lines 8—8 of FIG. 7;

FIG. 9 is a top plan view of the outer grommet seal;

FIG. 10 is an elevational cross sectional view taken along lines 10—10 of FIG. 9; and FIG. 11 is a partial front elevational view of a portion of the stator vane assembly, with a failed vane illustrated in dotted lines.

DETAILED DESCRIPTION OF THE PREFERRED EMBODIMENT

Figure 3:
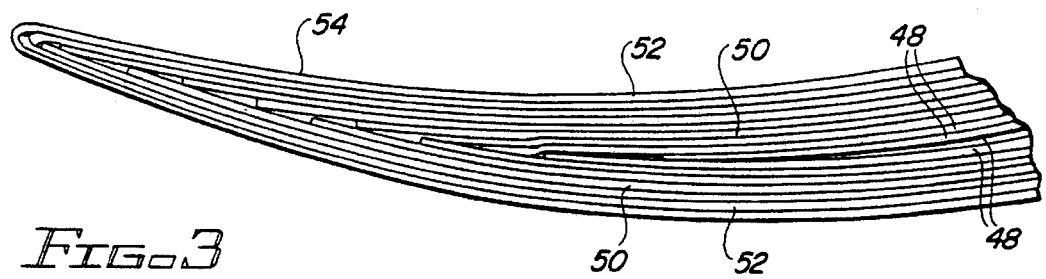
FIG. 3 is a partial plan cross sectional view of a typical stator vane, as viewed along lines 3—3 of FIG. 1.

Referring now more particularly to the drawings, a turbofan gas turbine engine generally referred to by the reference numeral 20 includes an outer casing 22, a rotary front fan 24, and a stator vane assembly 26 disposed immediately downstream of the blades 25 of the fan 24. The stator vane assembly is secured to the outer casing 22 in stationary relationship, and is also affixed to internal stationary support structure 28 of the engine. Downstream of the stator vane assembly 26, the compressed air flow may be split by a divider 30 into a core air flow passage 32 leading to the compressor stages of the gas turbine engine, and a bypass duct 34 wherein air flow may be exhausted out the rear of the engine.

As best depicted in FIGS. 1, 2, 6 and 11, the stator vane assembly 26 includes an annular or circular outer shroud 36 having opposed axial ends secured by conventional structure to casing 22. Additionally, the stator vane assembly 26 has an annular, metallic inner hub 38 secured to support structure 28. Spanning the radial space between shroud 36 and hub 38 are a plurality of stator vanes 40, which engage openings 37 in outer shroud 36 and similar openings 44 in hub 38. The assembly steps for creating vane assembly 26, and securing vanes 40 therein, is described in greater detail below.

Figure 2:
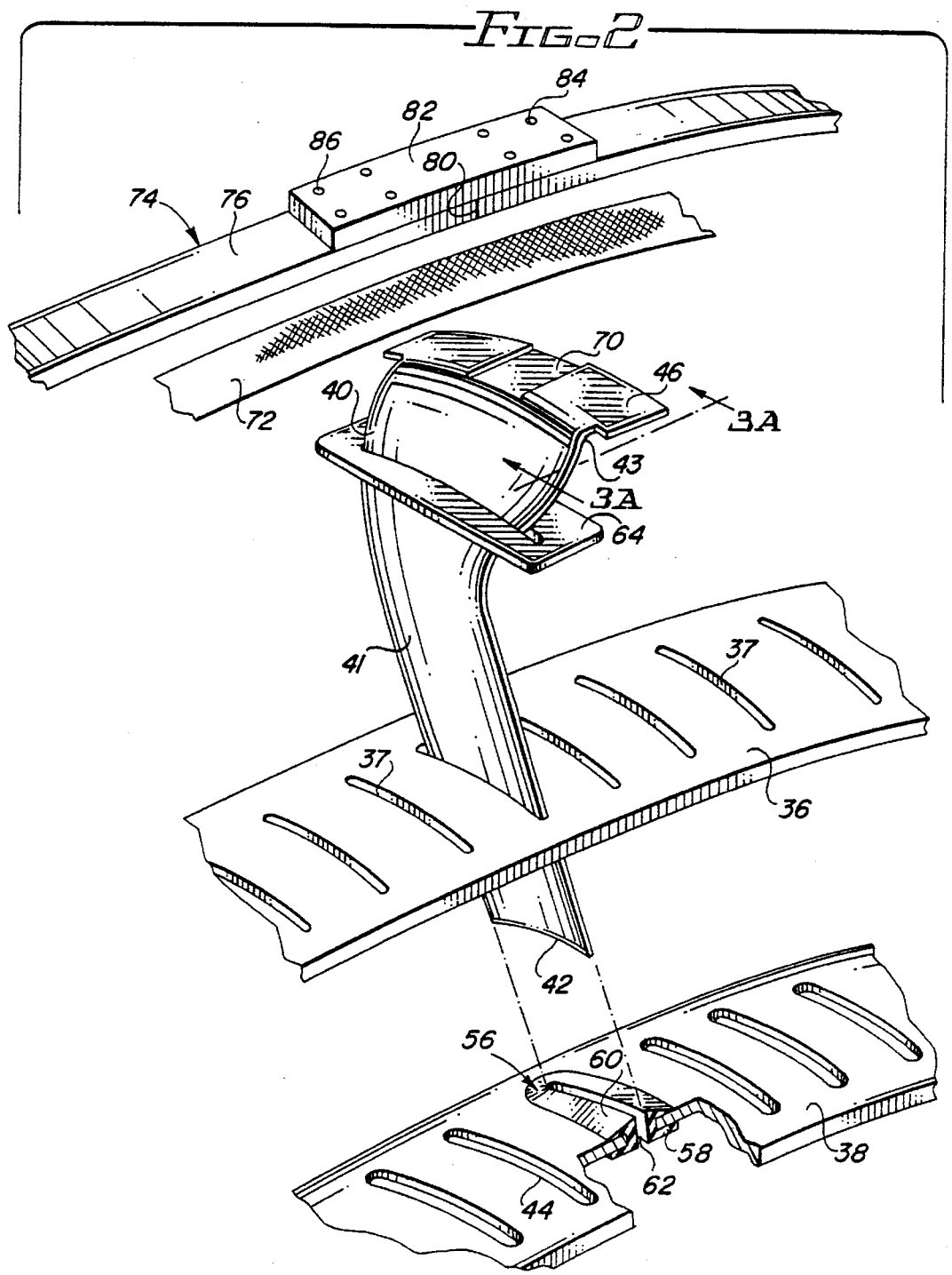
FIG. 2 is an exploded perspective view of partially assembled elements of the fan stator assembly of the present invention, with portions broken away to reveal internal details of construction.

Referring to FIG. 2, vane 40 is comprised primarily of an airfoil section 41 terminating at tip end 42. When installed in vane assembly 26, the airfoil section 41 spans the space between outer shroud 36 and hub 44, and serves to redirect and straighten the compressed airflow exiting fan blades 25 as described above. Opposite tip end 42, vane 40 forms a foot 46 substantially perpendicular to airfoil section 41, and extending circumferentially in one direction therefrom. Foot 46 is integral with vane 40 such that airfoil section 41 smoothly merges into foot 46 via transition section 43. Functionally, foot 46 acts to radially position and retain vane 40 in vane assembly 26, as described more fully below.

As illustrated in FIG. 3, the stator vane 40 is preferably comprised of a nonmetallic, composite material consisting of a plurality of compression molded, heat cured plies. The plies include up to seven centrally located plies of reinforcement material such as a continuous or unidirectional yarn of para-aramid fiber 48, such as Kevlar (a trademark of E. I. DuPont Demours & Company). In the preferred embodiment, the plies of para-aramid fibers 48 are nonwoven with the orientation of the inner directional yarns thereof substantially in alignment with the longitudinal, longest, axis of the vane 40. For reasons described in detail below, the para-aramid fibers 48 are configured to be discontinuous or broken proximate the bend or transition section 43 of vane 40. The term "broken" as used herein contemplates an arrangement wherein the fibers 48 are continuous throughout airfoil section 41 and foot 46, but are discontinuous, or in effect cut, at the juncture of airfoil section 41 with foot 46, or wherein the fibers 48 terminate in airfoil section 41 adjacent transition section 43.

Fibers 48 are broken as shown at 49 in order to facilitate a controlled failure of the stator vane, as described in greater detail below. This discontinuity 49 in fibers 48 presents, in effect, a weakened link in the stator. Preferably, it is proximate transition section 43, that is, substantially within the transition section or very near thereto in the airfoil section.

On each side of the centrally located plies of para-aramid fibers are a plurality of plies of resin impregnated graphite fiber material 50 and 52. These plies 50 are also nonwoven, unidirectional and divided in to two sets of plies. The first set of plies 50 of the graphite fibers are oriented at an acute angle of approximately 20 degrees to the orientation of the centrally located fibers 48. The outer set of plies 52 have an orientation of approximately 55 degrees relative to the orientation of the centrally located fibers 48. The set 50 comprises at least two plies of such graphite fibers, and the set 52 on each side of the centrally located fibers 48 also comprises at least two plies of the graphite fiber material. Acceptable graphite material is available from Hexcel Corp., Dublin, Calif. Optimally, a ply of woven steel wire mesh material 54 is placed on the external surface of the vane 40 in covering relationship to the leading edge thereof. All of the plies 48, 50, 52 and 54 are compression molded and heat cured in the same operation. The result is a strong, light weight composite material for vane 40.

The stator vane assembly 26 further includes an inner seal in the form of a hub grommet 56 illustrated in detail in FIGS. 5, 7 and 8. Grommet seal 56 is comprised of a flexible thermoelastic ether-ester elastomer, (such as "HYTREL" available from DuPont referenced above) material and has radially inner and outer lips 58, 60 overlying the inner and outer surfaces of hub 38 and extending through each of the openings 44. Grommet 56 has a central opening 62 closely configured to the inner tip 42 of the vane 40 for snugly, sealingly and receiving the same. It is important to note that vane 40 is radially restrained to hub 38 solely by frictional engagement with, and compression of grommet 56.

Disposed between the foot 46 of vane 40 and the outer surface of outer shroud 36 is a shroud grommet 64, also of flexible thermoelastic ether-ester elastomer material, disposed on the exterior surface of shroud 36 between it and the foot 46 of vane 40. Grommet 64 overlies a portion of the outer surface of shroud 36 to sealingly engage the latter, and also includes a radially inwardly extending lip 66 which closely surrounds and sealingly contacts the radially outermost portion of the air foil section of the vane 40. Grommet 64 also has an opening 68 therein through which the aerodynamic portion of the vane extends.

Foot 46 of each vane 40 extends radially and circumferentially therefrom, and includes a circumferentially extending central groove 70 therein. Disposed within groove 70 is a layer of protective tape 72 such as 3M type 25 tape, and a circular, annular band of metallic material 74 that extends around the entire circumference of the stator vane assembly 26. As described in greater detail below, the band 74 includes a strap 76 configured into a circular arrangement with opposing ends 80 thereof in approximately abutting engagement, and an overlying strip of metallic material 82 which is blind riveted at 84 and 86 to the opposed ends 80 of the strap 76 to hold the same in circular configuration, for purposes as described in greater below.

The fan stator assembly 26 may be conveniently and rapidly assembled in the following manner. First, the inner and outer shrouds 36, 38 are disposed in an assembly fixture (not shown) in the appropriate relative axial, concentric arrangement to one another, and circumferentially clocked with the associated openings 37, 44 thereof aligned radially. A stator vane 40 is assembled in the following manner. First, hub grommet 56 is mounted onto the hub 36 with the inner and outer lips thereof in surrounding, overlying relationship to the opening 44 therein. Also, the shroud grommet 64 is slipped loosely onto the stator vane 40 and pushed to a location somewhat adjacent the outer foot 46 thereof. The inner end 42 of the vane 40 is then inserted radially inwardly through opening 37 in outer shroud 36. FIG. 2 illustrates this partially assembled state. Then end 42 is pushed further radially inwardly through the opening 62 in the hub grommet 58 such that the inner tip end 42 of the vane extends slightly radially inwardly of the grommet 56. In this position of vane 40 the major radially and circumferentially extending sealing surface of grommet 64 is in abutting engagement with the radial inner surface of foot 46.

Each stator vane is sequentially inserted through the associated openings 37, 44 in the manner described above, until all stator vanes, grommets 56, and grommets 64 are in position. An assembly clamping tool (not shown) is then brought into engagement with the radial outer surfaces of the foot 70 of all the stator vanes 40. In this disposition the adjacent foot of each stator vane has the grooves 70 thereof aligned with one another to present a full circular, circumferential groove extending around the outer circumference of the assembly. Preferably, the clamping mechanisms may be disposed on opposite sides of the grooves 70 and extend circumferentially around the entire assembly. The clamping mechanism is then actuated to exert a uniform, radially inwardly directed, clamping force on the entire assembly. A clamping force of approximately 200 psi has been found adequate. Various types of assembly clamping mechanisms could be utilized. For example adjustable diameter circular bands could be placed around the assembly, then reduced in diameter to create the radial inward clamping force on the assembly.

Protective tape 72 is then positioned in the bottom of the aligned grooves 70, and band 74 is then placed upon the tape 72, positioned within the aligned grooves 70. Band 74 extends around the entire circumference of the assembly. The opposed ends of the strap 76 are brought adjacent one another, snugly lying within the aligned grooves 70. Strip 82 now overlies the opposed ends 80 of the strap 76, and blind rivets 84, 86 are installed from the radial outer direction to firmly intersecure the opposed ends of the strap 76. If desired, one end of the strip 82 may be pre-secured to one end of the strap 76 through blind rivets 84, requiring only the installation of the other set of blind rivets 86 to complete the securement of band 74 in to the aligned grooves 70.

Once the opposed ends 80 of strap 76 are so intersecured by installation of strip 82, band 74 is now holding the assembly with the radial inward clamping force still applied. The temporary assembly clamping mechanism may then be removed, and the radial inward clamping force on the assembly is still retained by virtue of band 74. In such position, outer grommet 64 is in adequate sealing interengagement with foot 70 and shroud 36 to preclude air leakage through the openings 37 in shroud 36. Similarly, vane 40 is in frictional, sealing interengagement with the walls of opening 62 in hub grommet 56, also pressing grommet 56 into sealing interengagement with hub 38. As a result, hub grommet 56 effectively precludes air leakage through the openings 44 in hub 38.

It is important to note that the inner tip end 42 of the vane 40 is not rigidly intersecured upon hub 38. Rather, each of the vanes 40 is radially held in place in the hub 38 solely by the frictional interengagement of the vane 40 with the grommet 56. It will now be clear that this radial nonsecurement of the vanes 40 to the hub 38 allows and facilitates the simplified, convenient, and rapid assembly of the entire stator vane assembly 26.

During operation of the gas turbine engine, foreign objects may be ingested through the inlet of the engine, passing by the primary fan blades 25 and impacting upon one or more of the vanes 40 of stator vane assembly 26. In aerospace applications, such gas turbine engines must be able to withstand foreign object damage up to a certain size, and the engine must continue to operate, perhaps on a reduced efficiency basis, for a predetermined period of time for safety of the aircraft.

The stator vane assembly 26 of the present invention facilitates safety and operation of the engine in the event of ingestion of foreign objects, by virtue of the structure and configuration of the stator vane assembly 26 as set forth previously. More particularly, a typical failure may be expected to occur due to foreign object damage. Once, a stator vane 40 has been impacted by an injested object, the radially inward tip of the vane pulls out, and the vane swings toward the back of the engine about the foot end. By virtue of the discontinuity 49 in the centrally located reinforcement plies 48 described earlier, the vane 40 is predisposed to fail where the airfoil section 41 of the vane 40 transitions into the foot 46. Failure is designed to occur at that location under a predetermined loading condition which can result from impact by foreign objects ingested into the engine. This loading condition is achieved only after the vane has deflected backwardly under the force of an impact beyond a critical deflected position. At some point after passing this critical position, the failure condition is achieved, and the airfoil section 41 of the vane is caused to tear away at discontinuity 49, leaving the foot 46 behind.

The significance of having the vane deflect beyond the critical position before tearing away can be understood by reference to FIG. 1. As noted above, downstream of the stator vane assembly 26, the compressed air flow may be split by a divider 30 into a core air flow passage 32 leading to the compressor stages of the gas turbine engine, and a bypass duct 34 wherein air flow may be exhausted somewhat unobstructed out the rear of the engine. It is thus desirable to prevent foreign objects ingested by the engine, or objects broken loose from inside the engine, from entering the core passage 32 and thereby damaging the compressor and turbine blades.

If a portion, or all of one of the composite fan stator vanes were to break off and enter the engine core passage 32, significant damage to the engine would likely result. Importantly, this invention assures that when a vane 40 is impacted with sufficient force to break off some or all of the vane, the vane deflects into bypass duct 34 before tearing away. In this way, damage to the core is avoided because the torn off airfoil section 41 passes relatively harmlessly through the bypass duct 34 and is ejected from the engine.

For field repair and overhaul purposes, the present invention offers further advantage. The stator vane assembly 26 may be readily disassembled in the field by reversing the assembly steps noted above. That is, a clamping tool is inserted about the circumference to allow rivets 86 to be removed from one end of strip 82 and thus release strap 76 and permit removal of band 74. One or more damages vanes 40 may then be replaced. In comparison, prior art stator, vane assemblies, with their weldments, potting, etc., normally require the entire stator vane assembly to be returned to the manufacturer, and a plurality of assembly components are required to be replaced even if only one vane requires replacement.

Various alterations and modifications to the preferred arrangement of the invention will be apparent to those skilled in the art. For example, the assembly method and technique could be utilized with metallic, rather than composite stator vanes. Further, the same controlled failure could be achieved by eliminating the para-aramid fibers 48 from the foot 46 entirely. Accordingly, the foregoing detailed description should be considered exemplary in nature and not as limiting to the scope and spirit of the invention as set forth in the appended claims.

Having described the invention with sufficient clarity that those skilled in the art may make and use it, what is claimed is:

1. In a gas turbine engine having a rotary primary fan and a stationary fan stator vane assembly disposed downstream of said fan, said assembly comprising:

an annular outer shroud having openings therein;

an annular inner hub having openings therein and disposed concentrically to and radially inwardly of said shroud to define a radial space therebetween;

a plurality of unitary stator vanes comprised of a nonmetallic composite material extending across said radial space and through said openings in said shroud and hub, each of said vanes having a radial inner end extending through the associated one of said openings in the hub, and an axially and circumferentially extending foot on the opposite radial outer end, said foot disposed radially outside said shroud, and an aerodynamically configured airfoil section disposed radially across said space, and a smoothly contoured transition section interconnecting said foot and said airfoil section, said composite material comprising a plurality of compression molded, heat cured plies, said plies including a plurality of centrally located internal plies of reinforcement material of continuous yarns of para-aramid fibers, and a plurality of plies of resin impregnated graphite fiber material on each side of said centrally located plies of reinforcement material, substantially all of said para-aramid fibers being broken proximate said transition section between said airfoil section and said foot.

2. A gas turbine engine as set forth in claim 1, wherein said stator vanes are located upstream of and crossing in front of both an outer bypass duct and an inner core passage, each of said vanes configured and located such that under sufficient force of impact said airfoil section tears away from said foot proximate the break in said para-aramid fibers, and passes into the bypass duct.

3. A unitary composite stator vane for a gas turbine engine comprising an aerodynamically configured airfoil section, a foot extending substantially perpendicularly from one end of said airfoil section, and a smoothly contoured transition section interconnecting said foot and said airfoil section, said stator vane comprised of a composite material including a plurality of compression molded, heat cured plies, said plies including a plurality of centrally located internal plies of reinforcement material of unidirectional yarns of para-aramid fibers, a plurality of plies of resin impregnated graphite fiber material on each side of said centrally located plies of reinforcement material, and an external steel wire mesh ply on the leading edges of said vanes, substantially all of said para-aramid fibers being broken proximate said transition section between said airfoil section and said foot.

4. A composite stator vane as set forth in claim 3, wherein said plies of para-aramid fibers are disposed with the same orientation of yarns.

5. A composite stator vane as set forth in claim 4, wherein each of said plies of para-aramid fibers are non woven.

6. A composite stator vane as set forth in claim 5, wherein a first inner set of said plies of graphite fiber on each side of said centrally located plies of para-aramid fibers are oriented at a first acute angle relative to the orientation of said para-aramid fibers.

7. A composite stator vane as set forth in claim 6, wherein a second outer set of said plies of graphite fiber on each side of said first set are oriented at a second angle greater than said first set.

8. A composite stator vane as set forth in claim 7, wherein said first acute angle is approximately 20 degrees.

9. A composite stator vane as set forth in claim 8, wherein said second angle is approximately 55 degrees.

10. A composite stator vane as set forth in claim 9, there being seven plies of said centrally located reinforcement material.

11. A composite stator vane as set forth in claim 10, wherein said first inner set of said plies of graphite fiber includes at least two plies, and said second outer set of said plies of graphite fiber includes at least two plies, such that the total number adjacent plies of both said para-arimid fiber and said graphite fiber is at least fifteen.

* * * * *